United States Patent
Cai et al.

(10) Patent No.: US 12,510,725 B2
(45) Date of Patent: Dec. 30, 2025

(54) CARRIER FOR LENS AND CAMERA MODULE WITH CARRIER

(71) Applicant: TRIPLE WIN TECHNOLOGY(SHENZHEN) CO.LTD., Shenzhen (CN)

(72) Inventors: Jin-Hui Cai, Shenzhen (CN); Shis-Tao Lai, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 550 days.

(21) Appl. No.: 17/987,799

(22) Filed: Nov. 15, 2022

(65) Prior Publication Data
US 2024/0061207 A1 Feb. 22, 2024

(30) Foreign Application Priority Data
Aug. 18, 2022 (CN) .......................... 202210994089.2

(51) Int. Cl.
 *G02B 7/02* (2021.01)
 *G02B 5/18* (2006.01)

(52) U.S. Cl.
 CPC ........... *G02B 7/025* (2013.01); *G02B 5/1847* (2013.01)

(58) Field of Classification Search
CPC ... G02B 7/025; G02B 5/1847; H04M 1/0264; B05C 5/0212
See application file for complete search history.

(56) References Cited

U.S. PATENT DOCUMENTS

2018/0309913 A1 10/2018 An et al.
2022/0107480 A1* 4/2022 Chen ...................... G03B 17/12

FOREIGN PATENT DOCUMENTS

| CN | 105577990 | 5/2016 |
| CN | 214380589 | 10/2021 |

* cited by examiner

*Primary Examiner* — James C. Jones
(74) *Attorney, Agent, or Firm* — ScienBiziP, P.C.

(57) ABSTRACT

A carrier of a camera module to receive glue for fixing a lens structure thereon comprises a glue dispensing area, the glue dispensing area comprises a bonding area and a groove extending outwards from the bonding area, the groove is directly adjacent to the bonding area to receive glue overflowing from the glue dispensing area. The groove prevents glue dispensed in the bonding area from overflowing towards, or entering, the center of the carrier and improves the production quality of the camera module. The application also discloses a camera module including the above camera carrier.

14 Claims, 7 Drawing Sheets

CARRIER FOR LENS AND CAMERA MODULE WITH CARRIER

CROSS-REFERENCE TO RELATED APPLICATION

This application claims priority to China Application No. 202210994089.2, having a filing date of Aug. 18, 2022, filed in China State Intellectual Property Administration, the entire contents of which are hereby incorporate by reference.

FIELD

The subject matter relates to manufacturing, and more particularly to a carrier with a glue overflow groove and a camera module with the carrier.

BACKGROUND

During production of a camera module of an electronic device, such as a mobile phone, a lens structure of the camera module requires to be glued to a carrier. Specifically, the carrier receives glue in a glue dispensing area, then the lens structure is pressed onto the glue on the carrier.

Generally camera modules are provided with a glue-limiting structure, as the glue may overflow from the glue dispensing area during the pressing, and the overflowed glue can flow into the camera module and contaminate the camera module, even cause failure of the camera module. However, the existing glue-limiting structure is too far away from the glue dispensing area to completely control the flow and overflow of the glue, thereby has a poor limiting effect.

SUMMARY

An objective of the present disclosure is achieved by providing carrier of a camera module comprises a glue dispensing area, the glue dispensing area comprises a bonding area configured for dispensing glue; and a groove extending outwardly from the bonding area and configured for receiving glue overflowing from the bonding area.

Alternatively or additionally, the groove extends from the bonding area to a center of the carrier.

Alternatively or additionally, the groove surrounds the bonding area.

Alternatively or additionally, the groove has a capacity of at least ¼ of a volume of glue dispensed in the bonding area.

Alternatively or additionally, the groove has a height h satisfying a formula as follows: $h=V/S$, wherein V is a capacity of the groove, and S is an area of an opening of the groove.

Alternatively or additionally, the groove has a cross-section in shape of a rectangle, an arc, or an oval.

Alternatively or additionally, the bonding area has a concave structure.

Alternatively or additionally, the bonding area communicates with the groove.

Alternatively or additionally, a chamfer is defined between the bonding area and the groove, the chamfer guides glue from the groove to the bonding area.

According to a further respect, a camera module is provided by the application, the camera module comprises a lens structure and the carrier above-mentioned for supporting the lens structure, the lens structure is glued to the carrier.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that, the terms "first" and "second" are used to distinguish between elements and are not used to denote a particular order or imply a number of technical features, therefore, unless specifically defined, features described as "first" and "second" may expressly or implicitly include one or more of the stated features. In the description of the present application, "plurality" means "two or more", unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

A description of the hereinafter described embodiments of the disclosure is presented herein with reference to the figures by way of exemplification and not as limitation.

Embodiment 1

Figure 1:
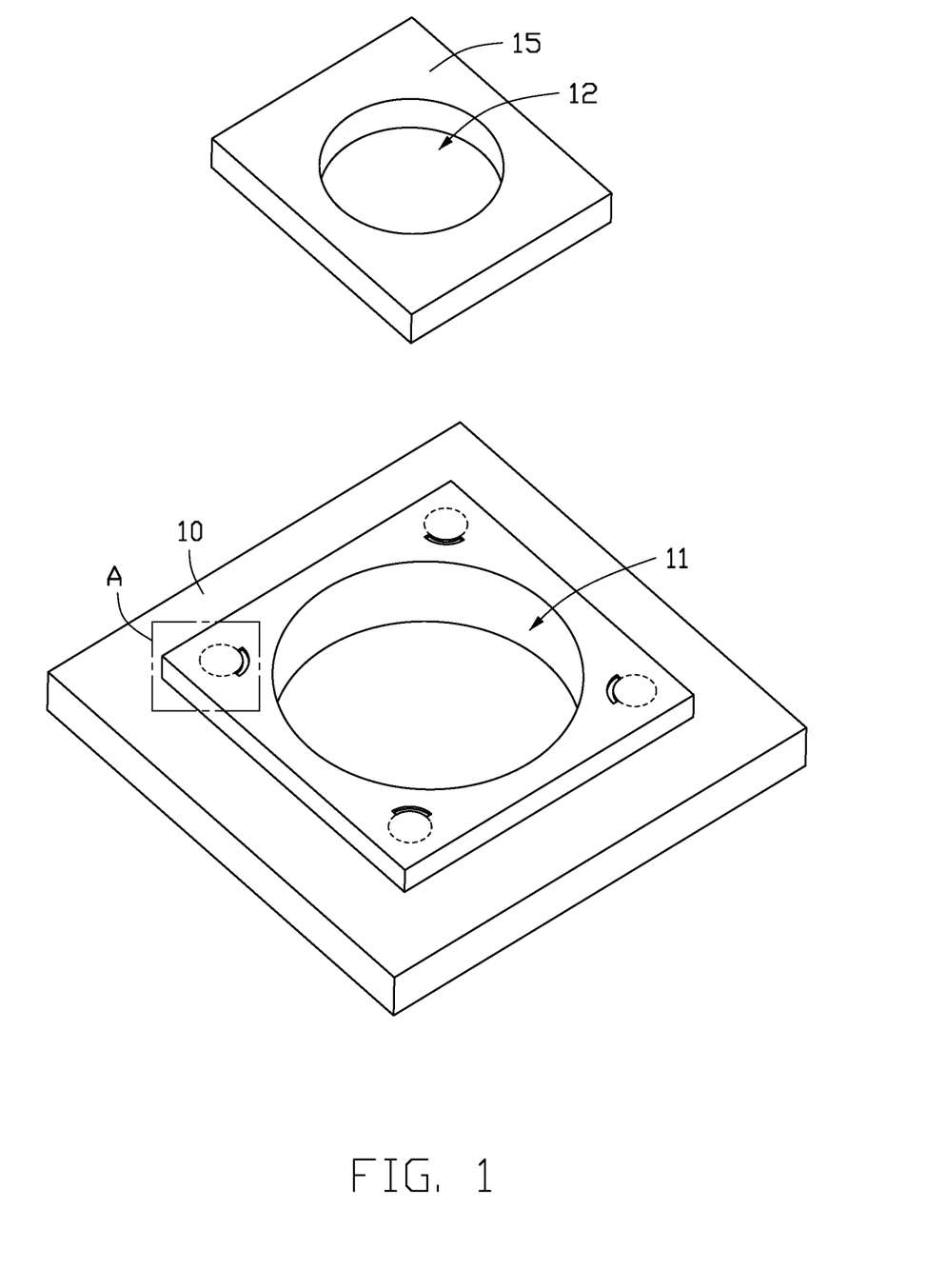
FIG. 1 is a perspective view of a baseboard and a carrier according to a first embodiment of the present disclosure.

Referring to FIG. 1, a carrier 10 is provided, a baseboard 15 of a lens structure is mounted by gluing to the carrier 10.

Figure 2:
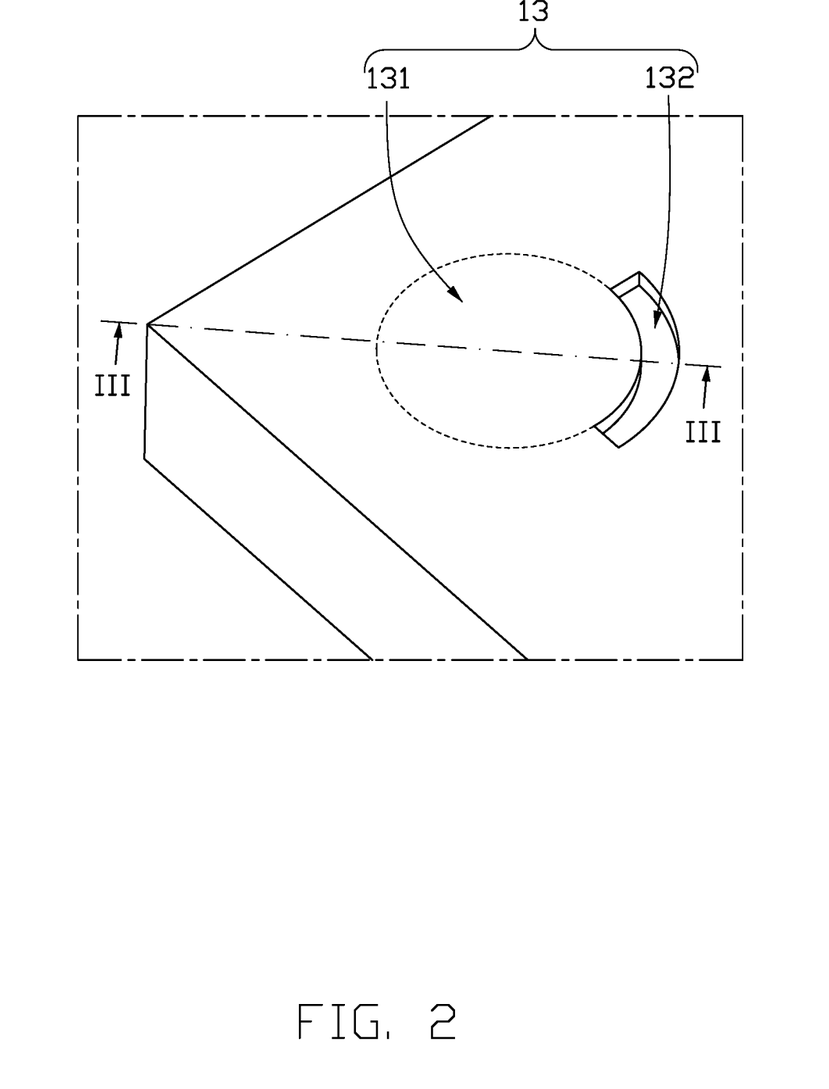
FIG. 2 is an enlarged view of section A in FIG. 1.

Referring to FIG. 1 and FIG. 2, the carrier 10 is a rectangular plate defining a first through hole 11 in the middle, the baseboard 15 defines a second through hole 12, and when the baseboard 15 is mounted to the carrier 10, the first through hole 11 and the second through hole are aligned. The carrier 10 has four glue dispensing areas 13 substantially at four corners of the rectangular plate for dispensing glue, each dispensing area 13 includes a bonding area 131 and a groove 132 extending outwards from the bonding area 131. The groove 132 is configured for receiving glue which may overflow from the respective bonding area 121. The bonding area 131 is illustrated by dashed line in the figures, as a shape of the glue dispensing area 13 or the bonding area 131 should not be seen as a limitation.

Therefore, when the baseboard 15 of the lens structure is to be glued to the carrier 10, a dispensing equipment dispenses glue at the bonding areas 131 of the carrier 10, then the baseboard 15 is placed on and pressed against the carrier 10 for gluing the baseboard 15 and the carrier 10 together firmly. During the pressing, the glue may overflow from the bonding areas 131 into the grooves 132, which prevents the glue from reaching the first through hole 11; further, the groove 132 extends outwardly from the bonding area 131 such that flow direction of the glue when overflowing is under control, the glue can flow directly into the groove 132 when being pressed and will not flow to other area between the baseboard 15 and the carrier 10, therefore, a clean surface of the carrier 10 is maintained.

Figure 3:
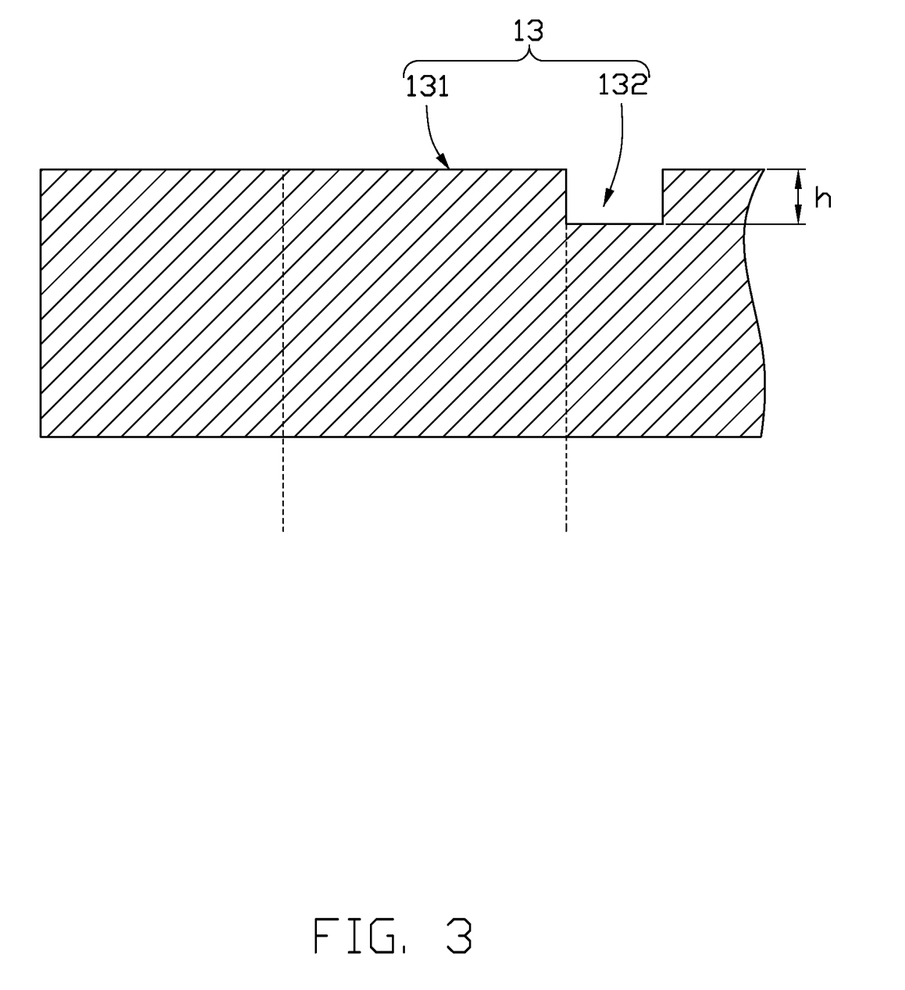
FIG. 3 is a cross section view along line of FIG. 2.

Referring FIG. 2 and FIG. 3, in further embodiments, the groove 132 is located between the bonding area 131 and the first through hole 11, that is, the groove 132 extends from the bonding area 131 to the first through hole 11, then glue overflowing from the bonding area 131 towards the first through hole 11 will be retained in the groove 13, and glue will not enter the first through hole 11.

The groove 132 can be any shape, such as a rectangle, arc, oval, or any other suitable shape, in this embodiment, the bonding area 131 is a circular area, and the groove 132 is an arc partly surrounding the bonding area 131 and is directly between the first through hole 11 and the bonding area 131.

Therefore, the groove 132 adjacent to the bonding area 131 occupies a small area of the carrier 10, then a larger space is provided for other structure or components.

Referring to FIG. 2, according to further embodiments, the groove 132 has a capacity of at least ¼ of the volume of glue dispensed in the bonding area 131, which completely prevents glue overflowing into the first through hole 11.

Referring to FIG. 3, the groove 132 has a height h which satisfies the formula: h=V/S, wherein V refers to a volume of the glue which can be received by the groove 132, and S refers to an area of an opening of the groove 132. The groove on the carrier 10 can be machined accordingly.

Embodiment 2

Figure 4:
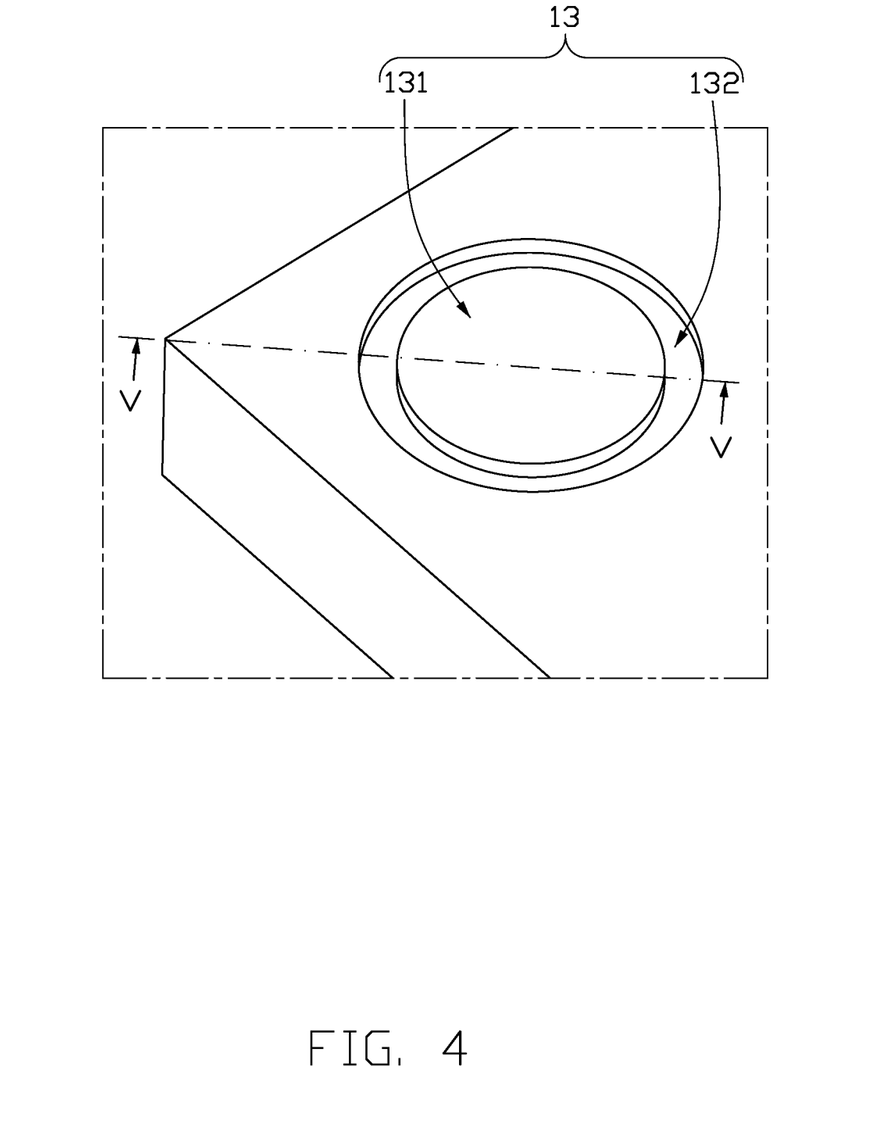
FIG. 4 an enlarged view of a groove and a glue dispensing area of a carrier, of a second embodiment of the present disclosure.
Figure 5:
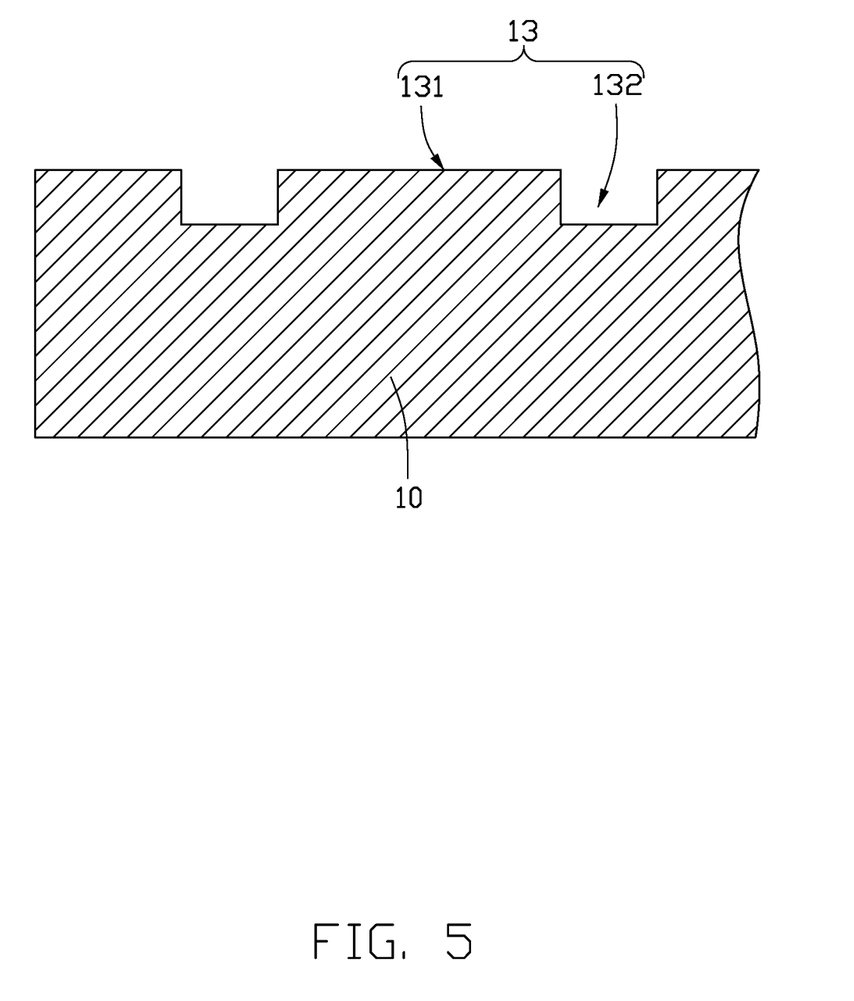
FIG. 5 is a cross section view along line V-V of FIG. 4.

Referring to FIG. 4 and FIG. 5, a carrier 10 of a second embodiment is provided, the configuration of the carrier 10 of the second embodiment is same as that of the first embodiment, except that the groove 132 is an entire ring surrounding the bonding area 131, then glue can be received by the groove 132 no matter what the direction of overflow may be. Further, in cases where the capacity of the groove 132 is same as that of the carrier 10, the groove 132 in this embodiment can have a smaller height and/or a smaller area of opening, retaining strength of the carrier 10.

Embodiment 3

Figure 6:
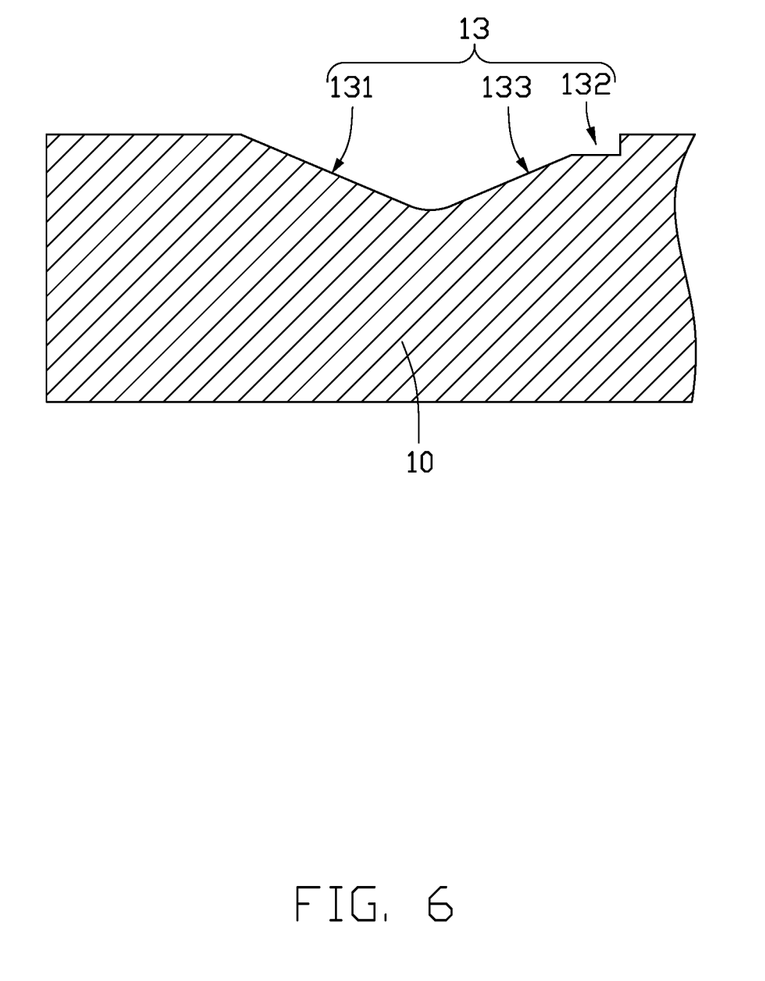
FIG. 6 is a cross section view of a groove and a glue dispensing area of a carrier, of a third embodiment of the present disclosure.

Referring to FIG. 6, a carrier 10 of a third embodiment is provided, the configuration of the carrier 10 of the third embodiment is same as that of the first embodiment, except that the bonding area 131 is machined to have a concave structure for containing the glue and prevent the glue from flowing uncontrolled, then the glue dispensed will converge due to the concave structure, and the glue in each glue dispensing area can be positioned consistently. In this case, the glue in each bonding area 131 is likely to overflow in similar paths when being pressed, then the flow direction of the overflowing glue is under control in any event.

Further, when pressed by a lens structure 20, the overflowing glue is presented with a concave structure it would have to climb, preventing the glue from further overflowing.

Referring to FIG. 6, in further embodiments, the bonding area 131 is in communication with the groove 13, and the lowest portion of the bonding area 131 is lower than a bottom of the groove 132. Therefore, the glue flowing into the groove 132 can return to the bonding area 131, which improves a utilization of the glue and sufficiency of gluing between the carrier 30 and the baseboard 15. A chamfer 133 is defined between the bonding area 131 and the groove 132 for leading overflowed glue from the groove 132 to the bonding area 131.

Figure 7:
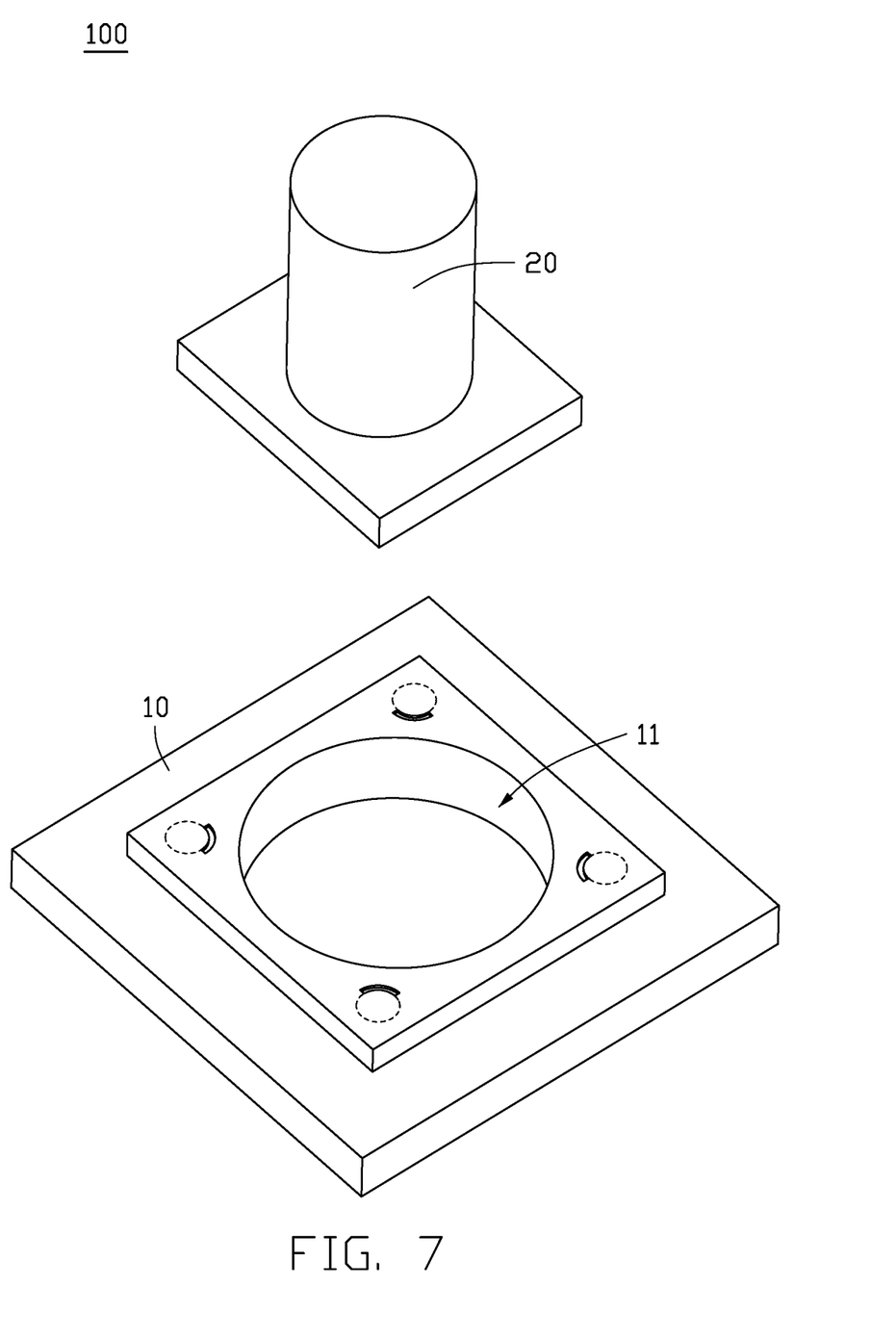
FIG. 7 is a camera module according to a fourth embodiment of the present disclosure.

Referring to FIG. 7, a camera module 100 is provided. The camera module 100 includes the lens structure 20 and the carrier 10, the lens structure 20 is mounted to the carrier 10 via glue, the carrier 10 can be any one of embodiments 1-3.

In this embodiment, the glue is conductive material providing a conductive connection between the lens structure 20 and the carrier 10 to provide power to the lens structure 20.

In operation, the lens structure 20 is glued to the carrier 10 in following steps:
firstly, dispensing glue at each bonding area 131 of the carrier 10;
secondly, placing the lens structure 20 on the carrier 10 and pressing the lens structure 20 against the carrier 10 for gluing the lens structure 20 and the carrier 10 together firmly.

During the pressing, the glue may overflow from the bonding area 131 into the grooves 132, which prevents the glue from reaching the first through hole 11; further, the groove 132 extends outwards from the bonding area 131, then a flow direction of the glue overflows is under control, the glue can flow directly into the groove 132 when being pressed to overflow and will not flow to other area between the baseboard 15 and the carrier 10. The carrier 10 can therefore maintain a clean surface.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A carrier of a camera module comprising a glue dispensing area, the glue dispensing area comprising
a bonding area configured for dispensing glue; and
a groove extending outwardly from the bonding area and configured for receiving glue overflowing from the bonding area;
wherein the groove extends from the bonding area to a center of the carrier, and the bonding area has a concave structure compared to the groove.

2. The carrier of claim 1, wherein the groove surrounds the bonding area.

3. The carrier of claim 1, wherein the groove has a capacity of at least ¼ of a volume of the glue dispensed in the bonding area.

4. The carrier of claim 3, wherein the groove has a height h satisfying a formula as follows: h=V/S, wherein V is a capacity of the groove, and S is an area of an opening of the groove.

5. The carrier of claim 2, wherein the groove has a cross-section in a shape of a rectangle, an arc, or an oval.

6. The carrier of claim 1, wherein the bonding area is in communication with the groove.

7. The carrier of claim 6, wherein a chamfer is defined between the bonding area and the groove, the chamfer guides glue from the groove to the bonding area.

8. A camera module comprising:
   a lens structure; and
   a carrier of any of claim 1, wherein the lens structure is glued to the carrier.

9. The camera module of claim 8, wherein the groove surrounds the bonding area.

10. The camera module of claim 8, wherein the groove has a capacity of at least ¼ of a volume of the glue dispensed in the bonding area.

11. The camera module of claim 10, wherein the groove has a height h satisfying a formula as follows: h=V/S, wherein V is a capacity of the groove, and S is an area of an opening of the groove.

12. The camera module of claim 9, wherein the groove has a cross-section in a shape of a rectangle, an arc, or an oval.

13. The camera module of claim 8, wherein the bonding area is in communication with the groove.

14. The camera module of claim 13, wherein a chamfer is defined between the bonding area and the groove, the chamfer guides glue from the groove to the bonding area.

\* \* \* \* \*